(12) United States Patent
Haesendonckx et al.

(10) Patent No.: US 9,498,913 B2
(45) Date of Patent: Nov. 22, 2016

(54) METHOD AND DEVICE FOR PRODUCING FILLED CONTAINERS

(75) Inventors: Frank Haesendonckx, Hamburg (DE); Dieter Klatt, Hamburg (DE); Thomas Von Hamme, Kisdorf (DE); Rolf Baumgarte, Ahrensburg (DE); Harald Rieger, Hamburg (DE);
(Continued)

(73) Assignees: KHS GMBH, Dortmund (DE); KHS CORPOPLAST GMBH, Hamburg (DE)

( * ) Notice: Subject to any disclaimer, the term of this patent is extended or adjusted under 35 U.S.C. 154(b) by 245 days.

(21) Appl. No.: 13/518,462

(22) PCT Filed: Dec. 7, 2010

(86) PCT No.: PCT/DE2010/001441
§ 371 (c)(1),
(2), (4) Date: Jul. 6, 2012

(87) PCT Pub. No.: WO2011/076167
PCT Pub. Date: Jun. 30, 2011

(65) Prior Publication Data
US 2012/0266567 A1    Oct. 25, 2012

(30) Foreign Application Priority Data

Dec. 23, 2009  (DE) .................. 10 2009 060 726
Feb. 9, 2010   (DE) .................. 10 2010 007 541

(51) Int. Cl.
*B65D 43/08*     (2006.01)
*B29C 49/46*     (2006.01)
(Continued)

(52) U.S. Cl.
CPC .............. *B29C 49/46* (2013.01); *B29C 49/12* (2013.01); *B29C 49/783* (2013.01); *B65B 3/022* (2013.01); *B29C 49/06* (2013.01); *B29C 49/36* (2013.01); *B29C 49/6418* (2013.01); *B29C 49/78* (2013.01); *B29C 2035/0822* (2013.01);
(Continued)

(58) Field of Classification Search
None
See application file for complete search history.

(56) References Cited

U.S. PATENT DOCUMENTS 4,076,071 A    2/1978  Rosenkranz et al.
5,346,386 A    9/1994  Albrecht et al.
(Continued)

FOREIGN PATENT DOCUMENTS

DE    2352926    4/1975
DE    4212583    10/1993
(Continued)

*Primary Examiner* — Monica Huson
(74) *Attorney, Agent, or Firm* — Lucas & Mercanti, LLP; Klaus P. Stoffel

(57) ABSTRACT

The method and the device are used to produce filled containers. A preform (2) made of a thermoplastic material is first subjected to thermal conditioning in the area of a heating section along a transport path. Then the preform (2) is shaped into the container (11) inside a mold by applying pressure. A filling medium (21) with which the container is to be filled is used as the fluid for forming the container. The preform (2) is guided at least intermittently while the preform is shaped into the container (11).

9 Claims, 8 Drawing Sheets

(75) Inventors: Lothar Wilhelm, Karben (DE);
 Thomas Stolte, Bad Kreuznach (DE)

(51) Int. Cl.
 *B29C 49/12* (2006.01)
 *B65B 3/02* (2006.01)
 *B29C 49/06* (2006.01)
 *B29C 49/36* (2006.01)
 *B29C 49/64* (2006.01)
 *B29C 49/78* (2006.01)
 *B29C 35/08* (2006.01)
 *B29K 23/00* (2006.01)
 *B29K 67/00* (2006.01)

(52) U.S. Cl.
 CPC .. *B29C 2049/1238* (2013.01); *B29C 2049/465* (2013.01); *B29C 2049/4664* (2013.01); *B29K 2023/06* (2013.01); *B29K 2023/12* (2013.01); *B29K 2067/00* (2013.01)

(56) References Cited

U.S. PATENT DOCUMENTS

| 5,648,026 | A | 7/1997 | Weiss | |
|---|---|---|---|---|
| 7,914,726 | B2 | 3/2011 | Andison et al. | |
| 2007/0164488 | A1* | 7/2007 | Jaksztat et al. | 264/523 |
| 2008/0029928 | A1* | 2/2008 | Andison et al. | 264/238 |

FOREIGN PATENT DOCUMENTS

| DE | 4340291 | | 6/1995 |
|---|---|---|---|
| EP | 1529620 | A | 5/2005 |
| JP | 2000043129 | | 2/2000 |
| WO | 0119594 | Y | 3/2001 |
| WO | 2005044540 | | 5/2005 |
| WO | 2007120807 | A | 10/2007 |

* cited by examiner

METHOD AND DEVICE FOR PRODUCING FILLED CONTAINERS

The present application is a 371 of International application PCT/DE2010/001441, filed Dec. 7, 2010, which claims priority of DE 10 2009 060 726.9, filed Dec. 23, 2009, and DE 10 2010 007 541.8, filed Feb. 9, 2010, the priority of these applications is hereby claimed and these applications are incorporated herein by reference.

BACKGROUND OF THE INVENTION

The invention relates to a method for manufacturing filled containers, wherein a preform of a thermoplastic material, after a thermal conditioning along a transport path, is deformed in the area of a heating section within a mold by applying pressure in the container, and wherein a filling medium to be filled into the container is used as the fluid for container deformation.

The invention further relates to a device for manufacturing filled containers of a thermoplastic material which includes at least one heating section arranged along a transport path of a preform, and a molding station provided with a mold, and wherein the molding station includes a feeding device for a filling medium to be filled into the container.

When a container is formed by the influence of blowing pressure, the preforms of a thermoplastic material, for example, preforms of PET (polyethylene terephthalate), are supplied within a blow molding machine to different processing stations. Typically, such a blow molding machine includes a heating device and a blow molding device in whose area the previously thermally conditioned preform is expanded into a container by biaxial orientation. The expansion takes place by means of compressed air which is admitted into the preform to be expanded. The process-technical sequence in such an expansion of the preform is explained in DE-OS 43 40 291. The introduction of the pressurized gas mentioned in the beginning also includes the introduction of compressed gas into the developing container bubble, as well as the pressurized gas introduction into the preform at the beginning of the blow molding process.

The basic construction of a blow molding station for molding containers is described in DE-OS 42 12 583. Possibilities for thermally conditioning the preforms are explained in DE-OS 23 52 926.

In accordance with a typical processing method, the blow molded containers manufactured as described above are fed to a subsequent filling device and are there filled with the intended product. Consequently, as a rule, a separate blow molding machine and a separate filling machine are used. It is also already known to couple a separate blow molding machine and a separate filling machine directly to each other and to thereby make available a so-called blocked blowing/filling device.

Moreover, it is also already known to carry out molding of the container by means of the filling material itself to be filled. For this purpose, an appropriately thermally conditioned preform is placed into a suitable mold and subsequently the liquid filling medium is conducted into the preform and the container bubble which develops in this preform. In this process, the container bubble is expanded until a complete contact at the inner contour of the mold is achieved and the container is filled. Such a method is also called a hydraulic molding method.

In a molding of the container by the filling medium itself, only one machine is still needed which however, has an increased complexity. However, first test results with such devices show that the quality of the manufactured containers is still significantly below the quality of conventionally manufactured blow molded containers. This is essentially due to the fact that a plurality of process parameters are available when carrying out a blow molding process which are not present or could not yet be determined in a hydraulic molding of containers.

SUMMARY OF THE INVENTION

It is the object of the present invention to improve a method of the type mentioned at the beginning, in such a way that with less complicated machines a qualitatively high-grade container deformation is supported while simultaneously providing high throughput rates.

In accordance with the invention, this object is met by at least temporarily guiding the preform during its deformation into the container.

It is another object of the present invention to construct a device of the type mentioned in the beginning, in such a way that high throughput rates are supported with simple construction and good product quality.

In accordance with the invention, this object is met in that the molding station includes a guiding device which acts at least temporarily on the container during the deformation of the preform into the container.

By guiding the preform during the deformation of the preform into a developing container bubble and subsequently into the container having the final contour, it is achieved that a center typically arranged in the area of the preform crest defined and is reproducibly positioned. Such a defined positioning is important because during the expansion of the preform into the container, a biaxial orientation of the material of the preform is carried out and for this purpose a targeted and preset material distribution within the wall of the deformed container is required. In the case of an uncontrolled container deformation, on the other hand, undesirable and especially non-uniform material distributions must be expected.

A particularly effective guidance during the molding process can be achieved by carrying out the guidance with the use of a stretching rod.

In accordance with an embodiment variation, it is provided that the filling medium is at least partially supplied through the stretching rod.

As an alternative or supplement, it is also considered to supply filling medium at least partially past the stretching rod.

A uniform molding process is achieved by supplying the filling medium at least temporarily with a constant volumetric flow.

Possibilities for influencing the material distribution within the wall of the shaped container are obtained by supplying the filling medium at least temporarily with a variable volumetric flow.

An extremely compact construction is achieved in that the container is shaped, filled and closed on a rotating process wheel.

Another embodiment variation resides in measuring a generated stretching force.

Only small stretching forces applied by the stretching rod can be ensured by controlling a volumetric flow of the filling medium in dependence on a measured stretching force.

DETAILED DESCRIPTION OF THE INVENTION

Figure 1:
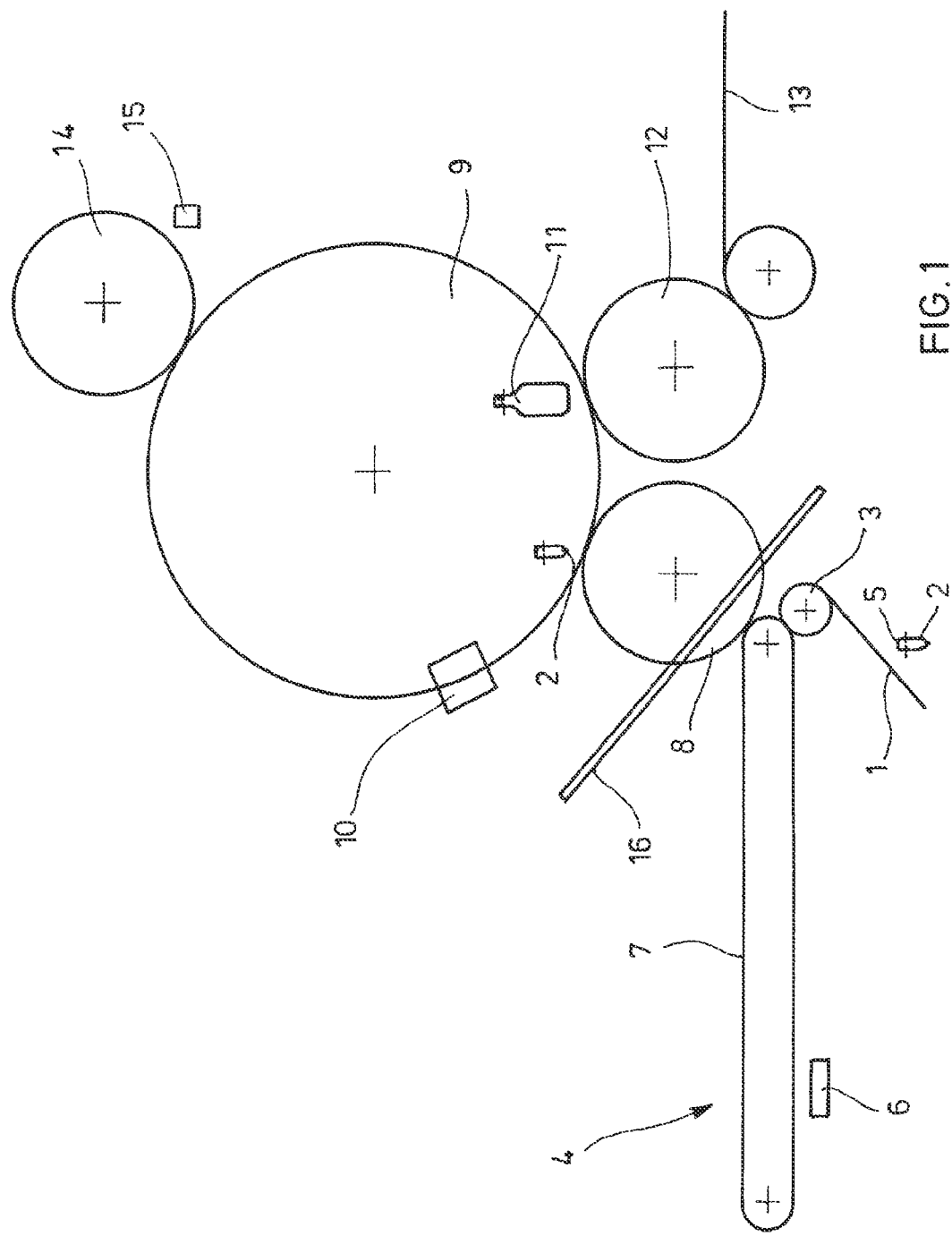
FIG. 1 is a schematic illustration of the basic construction of a device for carrying out a hydraulic container deformation with the use of a filling material.

The principal configuration of a combined molding and filling device is illustrated in FIG. 1. Schematically illustrated preforms 2 supplied by a feeding device 1 are fed through a heating device 4 with the use of a transfer wheel 3. In the area of the heating device 4, preforms 1 can be transported depending on the intended use, for example, with their opening sections 5 facing vertically upwardly or vertically downwardly. The heating device 4 can be equipped, for example, with heating elements 6 which are arranged along a transport device 7. For example, an endless chain may be used as the transport device 7.

For example, IR radiators or light-emitting diodes or NIR radiators can be used as heating elements 6.

After a sufficient thermal conditioning, the heated preforms 2 are transferred by a transfer wheel 8 to a process wheel 9 which is arranged so as to be capable of rotation. The process wheel 9 is equipped with a plurality of molding stations 19 in whose area a reshaping of the preforms 2 into schematically illustrated containers 11, as well as filling of the containers 11 with an intended filling medium, take place. The container deformation takes place synchronously controlled with the filling of the container and by the filling medium.

After molding and filling, the containers 11 are transported away from the process wheel 9 by a removal wheel 12 and are fed to an outlet section 13.

In accordance with the embodiment of FIG. 1, it is provided that an input device 14 supplies schematically illustrated closing elements 15 to the process wheel 9. This makes it possible to perform closing of the containers 11 already on the process wheel 9 and by using the removal device 12 to manipulate finished, filled and closed containers 11. For example, the closing element 15 can be constructed as a screw cap, a crown or bottle cap, or a sealing foil.

Different thermoplastic materials can preferably be used as material for the preforms 1. Polyethylene terephthalate (PET), polyethylene (PE), polyethylene naphthalate (PEN) or polypropylene (PP) shall be mentioned as examples. Dimensioning of the preforms and the weight of the preforms 2 can be adapted to the size, the weight, and the configuration of the container 11 to be manufactured.

In the area of the heating device 4 typically a plurality of electrical or electronic structural components are arranged. Moreover, the heating elements 6 are equipped with moisture-sensitive reflectors. Since in the area of the process wheel 9 filling and molding of the containers takes place with the use of the liquid filling medium, it must be ensured that an unintentional entry of moisture into the area of the heating device 4 is avoided. This can be achieved, for example, by a shielding 16 which provides at least a spray protection. Beyond that, it is also possible to suitably thermally condition transport elements used in the area of the transfer wheel 8 for the transport elements, or to intermittently admit pressurized gas in such a way that adhering moisture cannot reach the area of the heating device 4.

A manipulation of the preforms 2 and/or the containers 11 preferably takes place with the use of tongs and/or the opening section 5 by clamping or plug-in elements acting over areas at least partially from the inside or from the outside.

Figure 2:
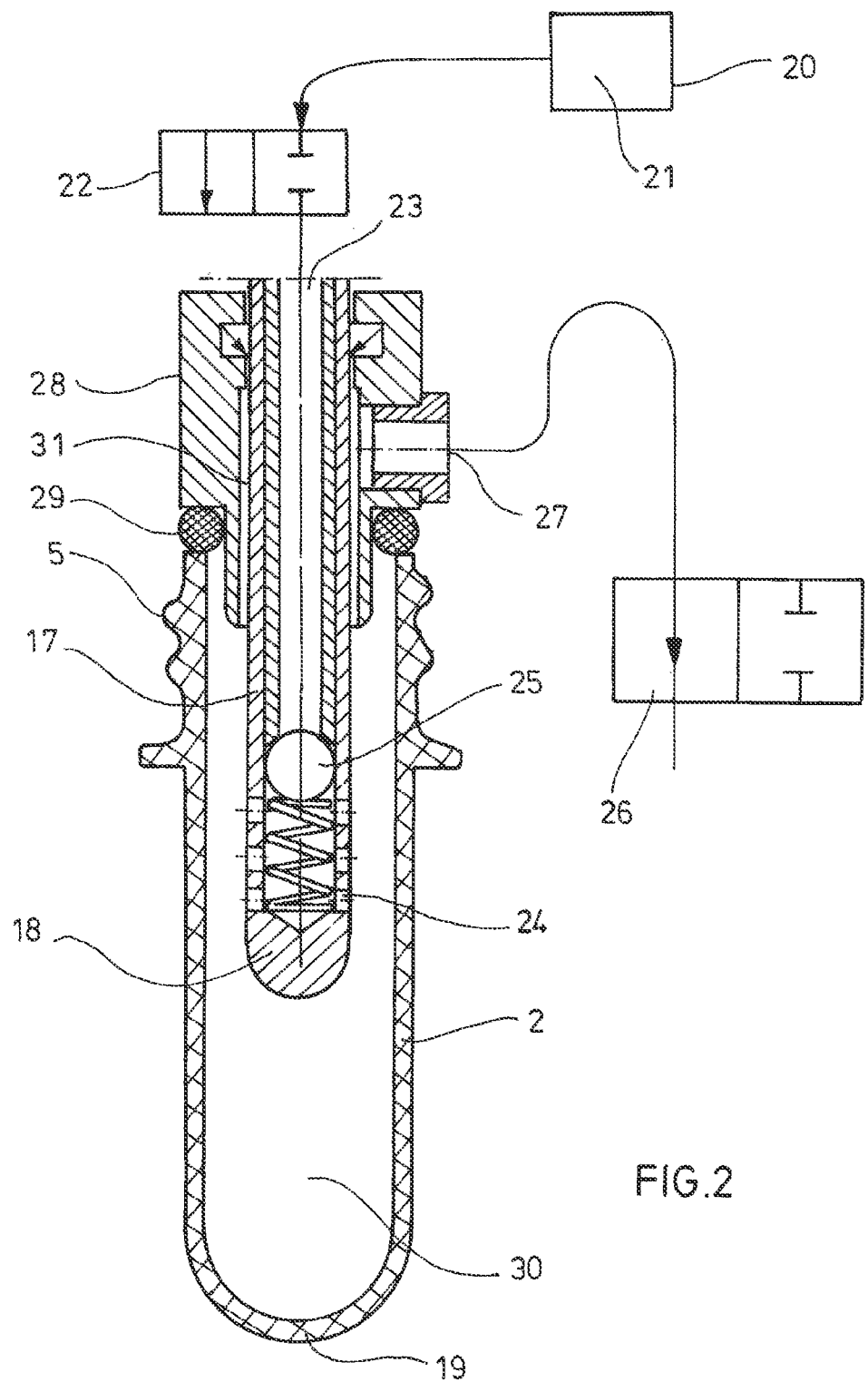
FIG. 2 is a schematic longitudinal sectional view of a preform with an already partially inserted stretching rod, as well as a ventilating device.

FIG. 2 shows a longitudinal sectional view of a preform 2 into which a stretching rod 17 is inserted. The stretching rod serves for at least temporarily guiding the preform 1 during its deformation into the container 11. Typically, a contact occurs between a crest 18 of the stretching rod 17 as well as a bottom 19 of the preform 2. When the stretching rod 17 is further retracted into the preform 2, a longitudinal stretching of the preform 2 is caused. After a conclusion of the stretching process, or at least temporarily already during carrying out the stretching process, a filling medium 21 removed from a supply device 20 is conducted into the preform 2.

Metering of the filling medium 21 takes place with use of a metering valve 22. In the illustrated embodiment, the stretching rod 17 is constructed hollow, at least over areas thereof, and the filling medium 21 is supplied to the interior space 23 of the stretching rod 17. In the area of a wall of the stretching rod 17 outlet openings 24 are arranged which can be locked by a check valve 25 relative to the metering valve 22. As a result, an unintentional dripping of filling medium 21 out of the stretching rod 17 can be avoided or minimized.

A ventilation of the preform 2 can be effected by using a ventilating valve 26. The ventilating valve 26 is connected to an outflow opening 27 which is arranged in the area of a connecting element 28 that contacts the preform 1. The stretching rod 17 can be positioned so as to extend through the connecting element 28. The preform 2 is sealed relative to the connecting element 28 by a seal 29 which may be constructed, for example, as an O-ring. An interior 30 of the preform 2 can be connected through an annular gap 31 to the outflow opening 27. The annular gap 31 encloses the stretching rod 17 over partial areas.

Figure 3:
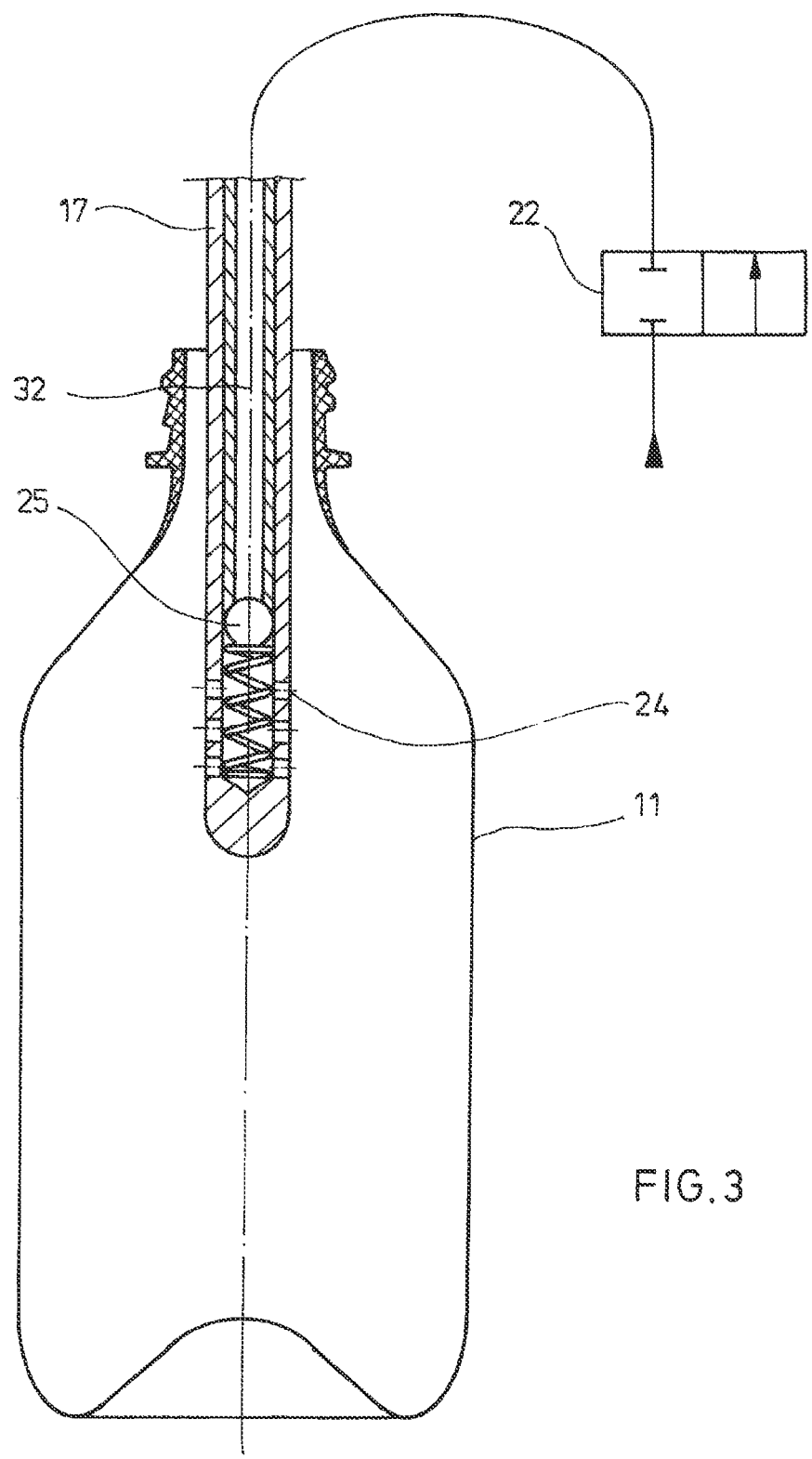
FIG. 3 is a schematic longitudinal sectional view of a shaped container with partially inserted stretching and filling device.

FIG. 3 schematically shows a similar device as shown in the illustration in FIG. 2 which uses a hollow stretching rod 17 with a built-in check valve 25. However, an already finished deformed container is illustrated. As can be seen in FIG. 2 as well as in FIG. 3 that a plurality of outlet openings 24 are preferably arranged in the area of the stretching rod 17. In the illustrated embodiment, such outlet openings 24 are positioned on different vertical levels along a longitudinal axis 32 of the stretching rod 17. In addition, the illustrated embodiment shows an alignment of the outlet openings 24 with an essentially horizontal outlet direction. However, the arrangement of the outlet openings 24 in the region of the stretching rod 17 as well as the alignment of the outlet openings 24 is variable. Typically, an outflow behavior is desired which is as quiet as possible and operates with little spraying.

Figure 4:
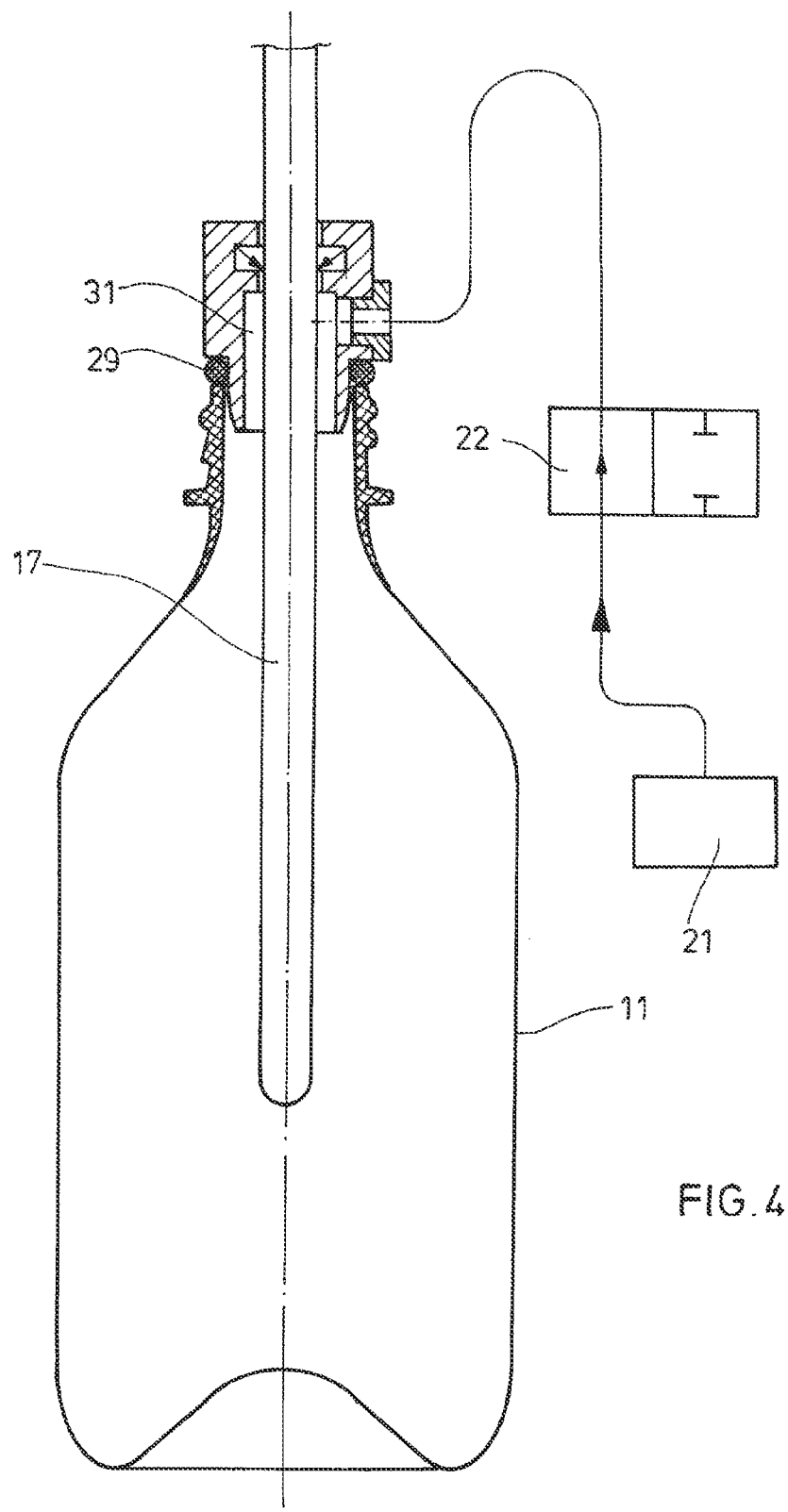
FIG. 4 is a longitudinal sectional view of a modified embodiment of the filling and molding device.

In accordance with the embodiment of FIG. 4, a solid stretching rod 17 is used. A supply of the filling medium 21 takes place at least along a flow duct past the stretching rod 17. The annular gap 31 is preferably used for this purpose. Also in this embodiment, it is possible to carry out targeted ventilation.

Figure 5:
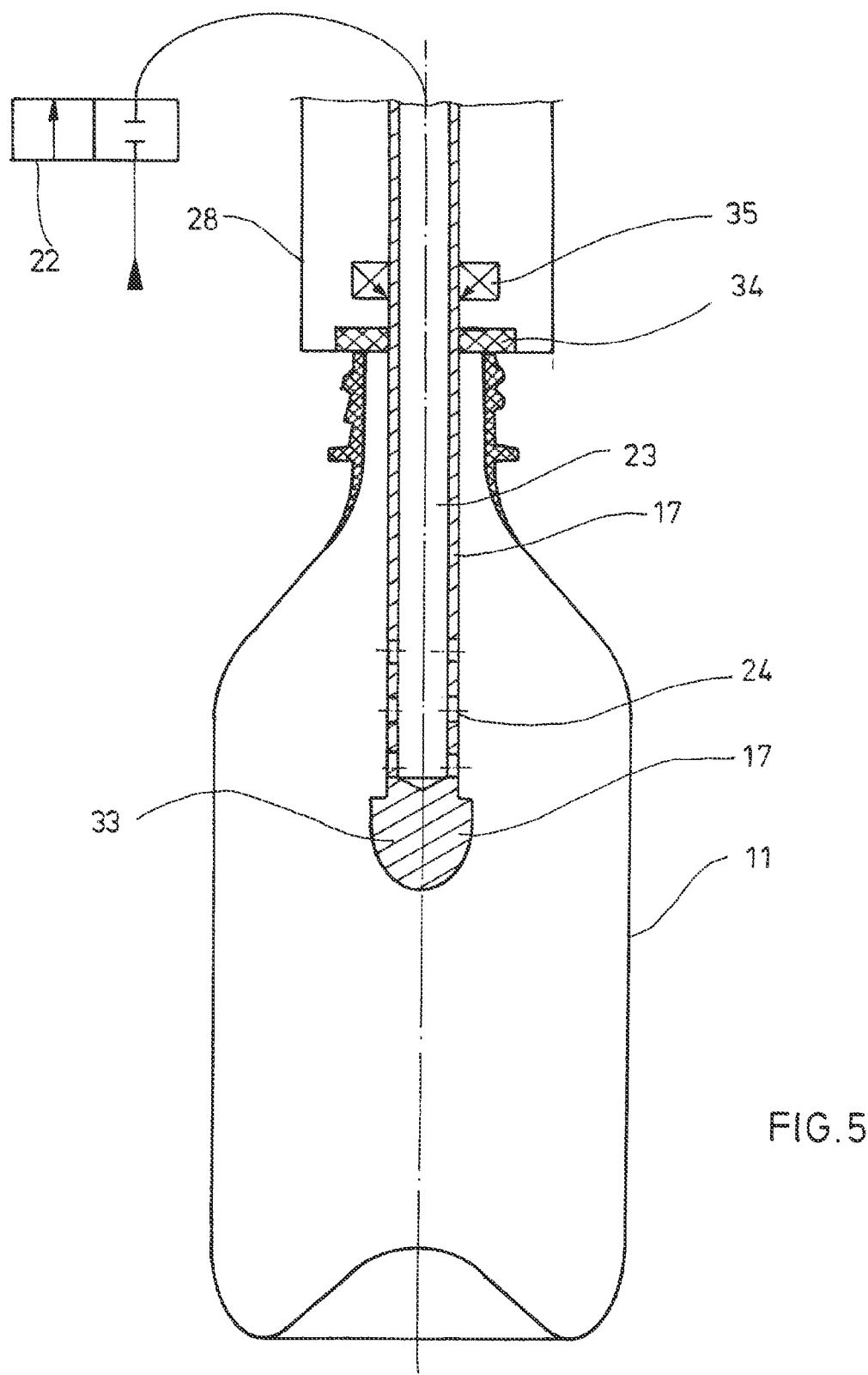
FIG. 5 is a longitudinal sectional view of a molding and filling device with sealing means for preventing dripping.

FIG. 5 shows an embodiment in which the stretching rod 17 has an optimized configuration for preventing dripping. For this purpose, a sealing element 33 is arranged in the area of the crest 17. The sealing element 33 may be made available, for example, by a diameter increase of the stretching rod 17. Also conceivable is a suitable material selection. When retracting the stretching rod 17 out of the container 11, the sealing element 33 comes into contact with a counter element 33 which is arranged in the area of the connecting element 28. The counter element 34 is preferably constructed as a sealing means. The outlet openings 24 of the stretching rod 17 are, after an appropriate positioning of the stretching rod 17, arranged sealed separately relative to the container 11, so that dripping out of the interior 23 of the stretching rod 17 can be safely prevented, in the area of the connecting element 28, typically at least one bearing 35 is arranged for guiding the stretching rod 17.

Figure 6:
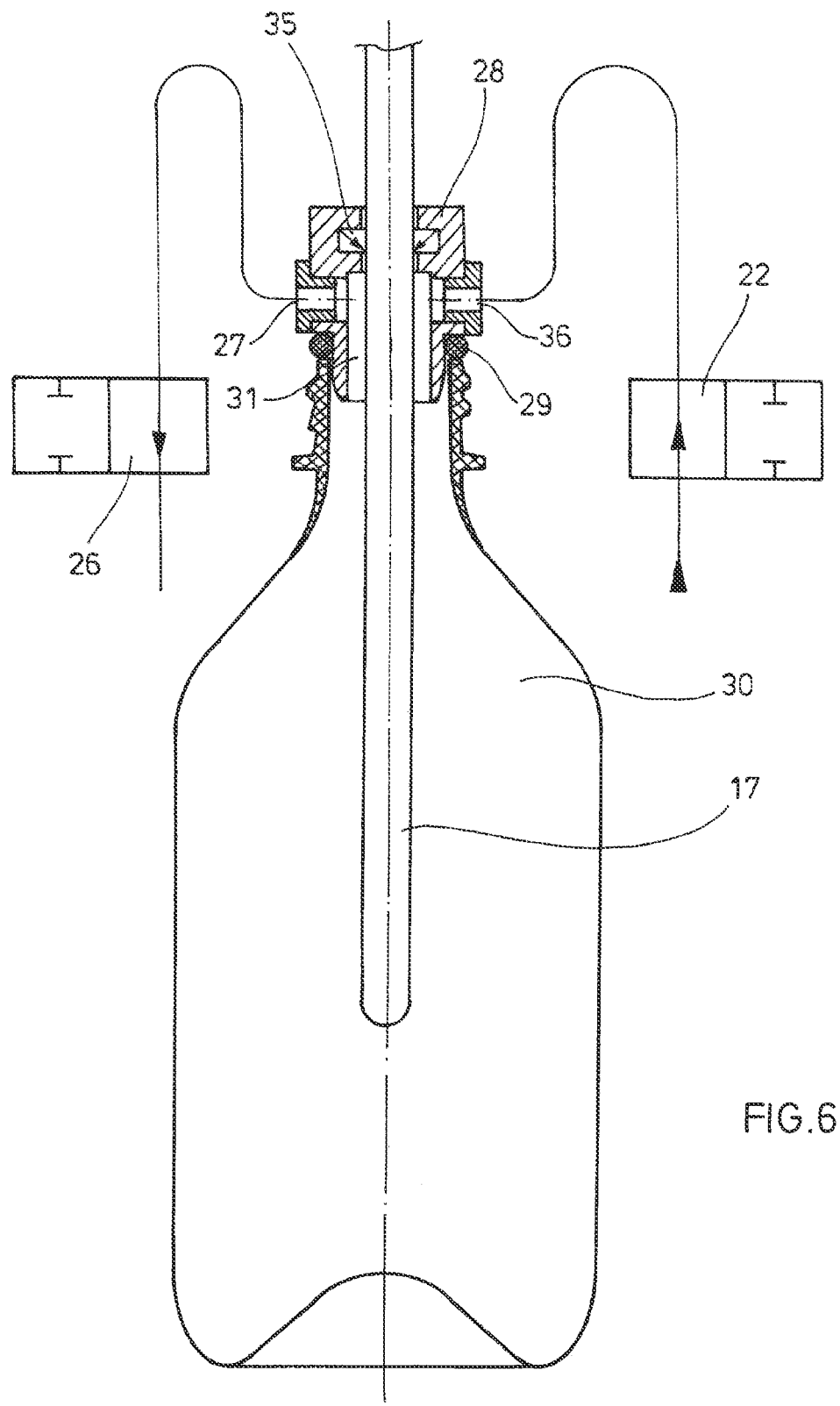
FIG. 6 shows an embodiment with controllable supply of the filling medium and separately controllable ventilation.

FIG. 6 shows an embodiment in which once again a solid stretching rod 17 is used. The metering valve 22 for the filling medium 21, as well as the ventilating valve 26, are connected to the interior 30 of the preform 2 or the container 11 through flow ducts extending past the stretching rod 17, particularly through the annular gap 31. In the illustrated embodiment, the outflow opening 27 is arranged in a radial direction of the connecting element 28 opposite a supply opening 36 which is connected to the metering valve 22.

Figure 7:
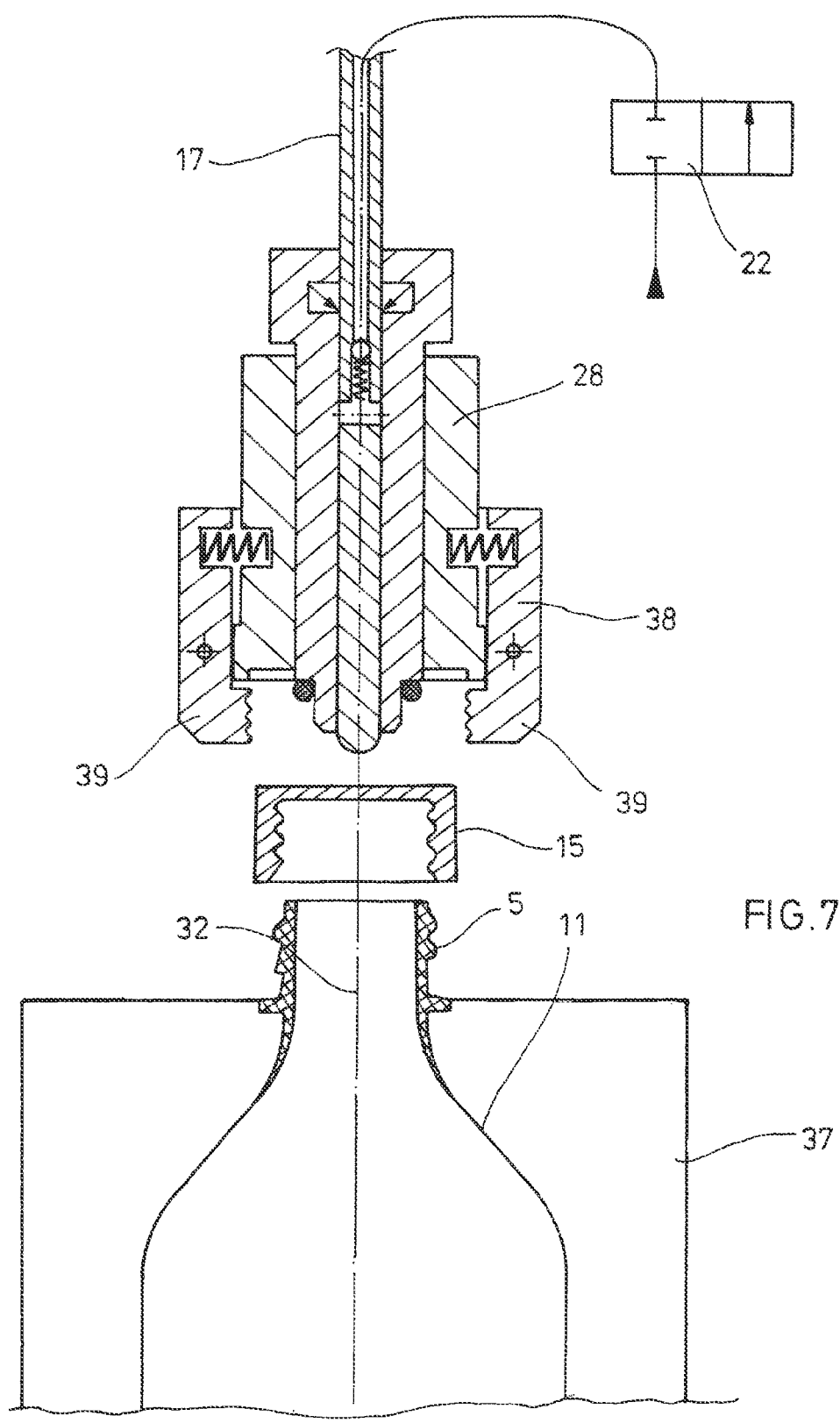
FIG. 7 is a schematic illustration of a combined shaping, filling and closing device.

FIG. 7 shows an embodiment in which in the area of the process wheel 9 according to FIG. 1, closing of the containers 11 also takes place. In this stage, the container 11 is still arranged in the area of a mold 37 which forms a part of the molding station 10 according to FIG. 1. In this embodiment, a closing device 38 is arranged relative to its longitudinal axis 32 coaxially with the connecting element 28. The closing device 32 includes, for example, pivotably arranged gripping members 39 which are provided for acting on the closing element 15. In particular, it is intended to arrange the closing device 38 so as to be rotatable relative to the connecting element 28. As a result, the closing element 15 can be screwed with an internal thread onto an external thread of the opening section 5.

Figure 8:
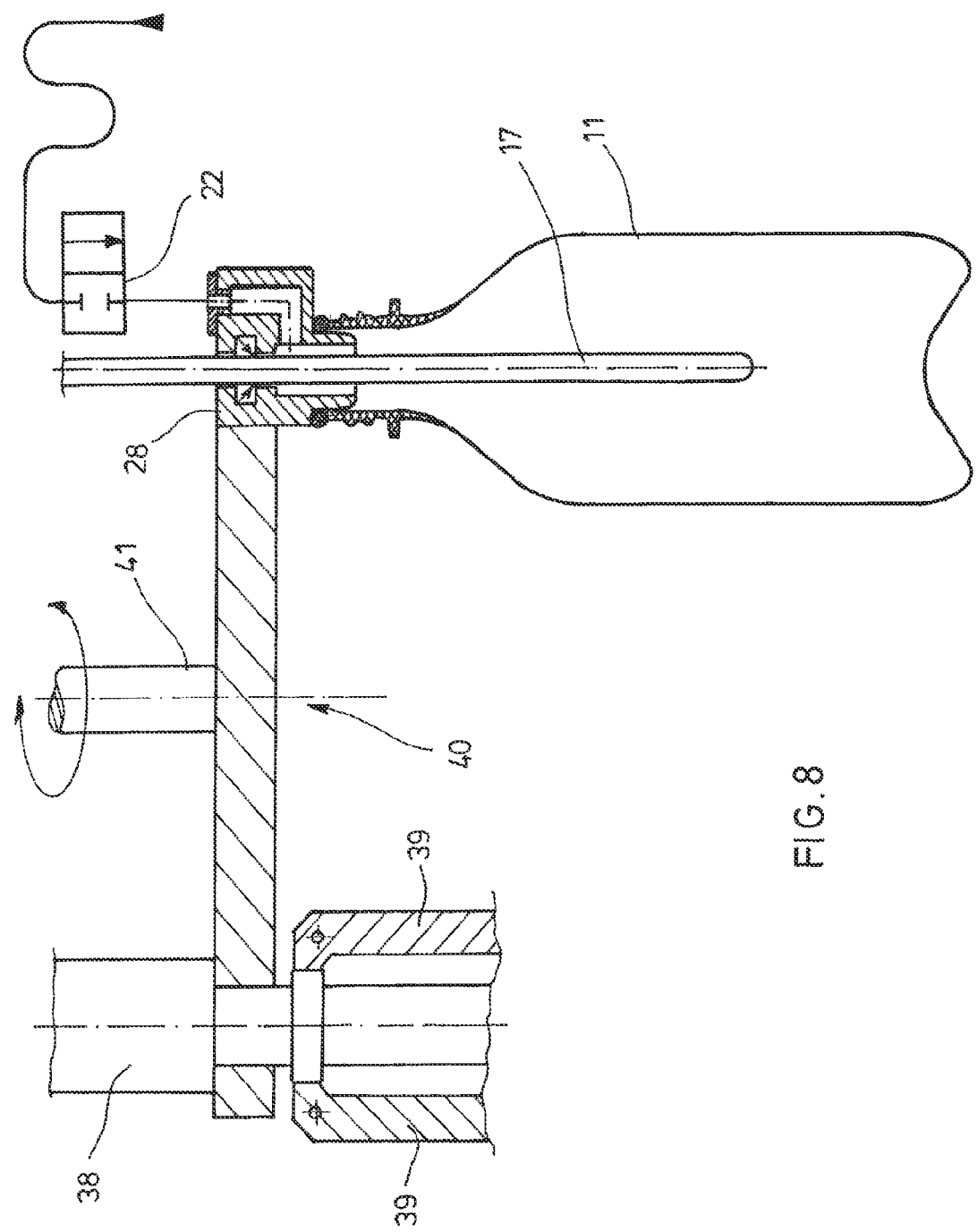
FIG. 8 shows another embodiment of a combined device according to FIG. 7.

FIG. 8 shows an alternative embodiment for the construction according to FIG. 7. The closing device 38 and the connecting element 28 are, in this case, not arranged coaxially relative to each other rather, they are positioned by a tool carrier 40 alternatingly in a position of operation and a position of rest. The tool carrier 40 may be constructed for example, like a revolver and can be provided with an axis of rotation 41.

In the following, some parameters typical of the process are explained in more detail as examples. The filling medium 21 is preferably supplied to the connecting element 28 at a temperature of the surrounding space, for example, in the range of 20° C. to 30° C. This causes the filling medium 21 to cool the material of the container 11 and reinforces a rapid stability with respect to the shape of the molded container 11. As a result, a very short cycle time is supported. However, it is also possible to supply the filling medium 21 cooled to a greater extent, or heated.

During molding of the container 11, the filling medium 21 can be introduced at least temporarily with a constant volumetric flow into the preform 2 or into the container 11. However, it is also possible to set up a suitable profile with respect to time for the volumetric flow in such a way that differently sized volumetric flows are generated at different times.

Prior to introducing the filling medium 21, it is possible to withdraw any air present within the preform 1 and/or to replace it with an inert gas. This is recommended especially in the case of oxidation-sensitive filling media 21.

Either pure liquids or liquids provided with additives can be used as filling medium 21. In particular, it is being considered to supply carbonized filling media. Since the filling medium 21 is supplied to the preform 1 or the container 2 under pressure, for example, at a pressure of 10 bar, it has been found to be useful to construct all flow paths for the filling medium 21 in such a way that local decompressions by the flow processes are avoided. A local or temporary decompression could otherwise lead to a gassing-out of carbon dioxide.

Alternatively to the heating illustrated in FIG. 1 of preferably injection molded preforms 2, it is also possible to manufacture the preforms 2 immediately prior to their deformation into the containers 11. This can be effected, for example, by an injection molding process as carried out in a so-called single-stage injection blow molding process; also possible is a compression deformation. Such a shaping of the preforms 2 avoids the use of electrical and electronic components in the area of a heating device, or reduces at least significantly the extent of use of such components because they are then merely required for an eventually necessary temperature profile.

Corrosion-resistant materials are preferably used as materials for the components of the process wheel 9. Especially the use of stainless steels and synthetic materials is being considered. It is especially considered to construct the molds 37 entirely or partially of a suitable synthetic material.

For minimizing the necessary stretching forces, it is considered to reinforce the stretching process by a supply of the filling medium 21. However, in the case of such reinforcement, it must be ensured that the guidance of the preform 2 through the stretching rod 17 is secured. This can be effected, for example, by measuring the acting stretching force and a control of the volumetric flow of the filling medium 21 in such a way that a minimum stretching force is always maintained. The magnitude of the stretching force can be determined very easily in electrically driven stretching systems by measuring the drive current, or in pneumatic stretching systems, by a pressure measurement.

When the containers 11 are filled with the filling medium 21, it is frequently desired that a gas-filled head space is made available after closing of the container 11. This free head space can be generated by the reduction of volume resulting from the retraction of the stretching rod 17.

The material selection already explained above takes place especially also considering hygienic requirements. In this regard, a disinfecting or sterilization capability is ensured. Also, the structure is such that the requirements with respect to a good cleaning capability are met.

One or more of the transfer wheels may be equipped with servo drives.

Consequently, this particularly reinforces a complete separation of the heating device 4 from the process wheel 9 while cleaning processes are carried out. It is also being considered to arrange retractable manipulating elements in the area of at least one transfer wheel. A further moisture protection can be effected by using a dry air tunnel.

In the following, a concrete process sequence is described as an example. Prior to or after placing the preforms 2 in the mold 37, initially a gas exchange takes place in the interior of the preform, especially for displacing oxygen or for reducing the content of oxygen. A rinsing and/or evacuating procedure typically takes at most 0.1 seconds. Stretching of the preform 2 with the use of the stretching rod 17 typically lasts about 0.2 seconds. In addition, for the filling and the resulting deformation of the preform 2 in the container 11 a time period of about 0.2 seconds is provided. For the subsequent provision of a head space, typically a maximum time period of 0.2 seconds is required. The process of quieting and unloading the filled container takes place very quickly in noncarbonated beverages; whereas in carbonated beverages this procedure may take a time period of up to 5 seconds.

A treatment of the head space can subsequently take place, for example, with the use of high pressure foaming or metered addition of nitrogen. The subsequent feeding of a closure cap may take in carbonated beverages a time period of up to 1.5 seconds. Also, the process of closing or screwing on may take, for example, a time period of 1.5 seconds.

After closing of the container 11 is finished, the mold 37 opens and the filled container 11 is removed and transported away.

A typical pressure pattern usually results in the filling system during the introduction of filling material into the preform 2 to be deformed or into the container 11 still present in the mold. Because of the expansion of the container 11, initially a comparatively low pressure exists, which rises toward the end of the molding process. The corresponding pressure increase or the magnitude of the pressure increase in the filling system, particularly in the filling line, can be utilized as a control value for a subsequent process step and may determine the point in time of the start of this next process step. Alternatively, or as a supplement, it is also being considered to use as control values the characteristics of the pressure pattern and/or the volumetric flow of the filling material.

With respect to the temperature of the filling material, it is particularly considered to feed in the filling material with an ambient temperature. In dependence on the respective border conditions of use, it is also conceivable that a temperature rise or decrease takes place relative to a filling with ambient temperature.

In accordance with another variation it is considered to carry out the filling process in two stages, wherein, during the first process step, the filling material is fed in with a temperature which is greater than the temperature during the second process step. The first process step can be carried out for example, when the longitudinal stretching of the preform 2 by means of the stretching rod 17 is carried out. The second process step then follows the execution of the stretching process and corresponds to the transverse expansion of the container 11.

For carrying out quieting of the head space after the pressure release, it is also being considered to possibly suction off any forming gasses and/or foam.

With respect to closing the finished molded and filled containers 11 different variations can also be realized. In a variation it is possible to provide a portion of the treatment station on the blow wheel with a revolver head. The revolver head includes a blowing and filling head on the one hand, and a closing head on the other hand. This corresponds to the schematic illustration in FIG. 8. However, it is also conceivable to use an integrated construction in which the respective head carries out the blowing, the filling and the closing procedures.

In accordance with a further variation, the blowing, filling and closing heads are constructed as separate structural components, but are arranged pivotally at each molding and filling station. In accordance with a third variation, only the blowing and filling heads are arranged on the blow wheel and a transfer of the still open container to a separate closing device takes place, for example, a transport wheel which is equipped with a closing head.

The application of the closures, for example, the closing caps, can take place, for example, immediately following the opening of the molds 37. Consequently, this would mean that the closing caps can be transferred, to the blow wheel. In particular, it is being considered to admit an inert gas to the opening space of the filled container 11 prior to transferring the closing caps.

The invention claimed is:

1. A method for manufacturing filled containers, comprising the steps of: thermal conditioning a preform of a thermoplastic material along a transport path in an area of a heating section; deforming said preform, within a mold, into a container by pressure application in the container, using a filling medium to be filled into the container as fluid for the container deformation; and guiding the preform with a stretch rod during deformation into the container, wherein an acting stretching force of the stretch rod acting on the preform is measured and a volumetric flow of the filling medium is controlled depending on the measured stretching force so that a minimum stretching force is always maintained.

2. The method according to claim 1, including supplying the filling medium at least partially through the stretching rod.

3. The method according to claim 1, including supplying the filling medium at least partially past the stretching rod.

4. The method according to claim 1, including supplying the filling medium at least temporarily with a constant volumetric flow.

5. The method according to claim 1, including supplying the filling medium at least temporarily with a variable volumetric flow.

6. The method according to claim 1, including shaping, filling and closing the container on a rotating process wheel.

7. A device for manufacturing filled containers of a thermoplastic material, comprising: at least one heating section arranged along a transport path of a preform; and a molding station provided with a mold, wherein the molding station includes a feeding device for a filling medium to be filled into the container for deforming the preform into the container, and a stretch rod as a guiding device for at least temporarily acting on the preform during deformation, wherein the guiding device exerts a measurable stretching force on the preform, and volumetric flow of the filling medium is controllable depending on the measurable stretching force so that the guiding device always exerts a minimum stretching force on the preform.

8. The method according to claim 1, wherein the stretch rod is driven electrically and the acting stretching force is measured by measuring drive current.

9. The method according to claim 1, wherein the stretch rod is driven pneumatically and the acting stretching force is measured by a pressure measurement.

* * * * *